United States Patent
Aloi et al.

[11] Patent Number: 5,444,501
[45] Date of Patent: Aug. 22, 1995

[54] GOLF STABILIZER FOR LESS DOMINANT EYE

[76] Inventors: Joanne Aloi; Joseph Aloi, both of 7 Mangin Rd., Commack, N.Y. 11725

[21] Appl. No.: 222,175

[22] Filed: Apr. 1, 1994

Related U.S. Application Data

[63] Continuation of Ser. No. 988,100, Dec. 9, 1992, abandoned.

[51] Int. Cl.6 .......... G02C 7/10; G02C 7/16; G02C 9/00
[52] U.S. Cl. .......... 351/44; 351/45; 351/46; 351/47; 351/163; 273/187.6
[58] Field of Search .......... 351/44, 45, 46, 47, 351/57, 162, 163, 165; 273/183.1, 187.6

[56] References Cited

U.S. PATENT DOCUMENTS

| | | | |
|---|---|---|---|
| 1,135,921 | 4/1915 | Ramsay . | |
| 1,180,341 | 4/1916 | Thomas | 351/44 |
| 1,206,132 | 11/1916 | Otte . | |
| 1,247,853 | 11/1917 | McWenie | 351/46 |
| 1,283,815 | 11/1918 | Lamphier . | |
| 1,353,759 | 9/1920 | Keitz . | |
| 1,480,821 | 1/1924 | Henry . | |
| 1,605,418 | 11/1926 | Wittkopf . | |
| 1,637,406 | 8/1927 | Brumder . | |
| 1,683,505 | 9/1928 | Walker | 351/46 |
| 2,045,399 | 6/1936 | McMurdo | 88/41 |
| 2,527,027 | 10/1950 | Mull | 2/14 |
| 2,663,021 | 12/1953 | Douglass | 2/14 |
| 2,895,376 | 7/1959 | Linder, Jr. | 351/44 |
| 3,228,696 | 1/1966 | Hull | 273/183 |
| 3,264,002 | 8/1966 | Palumbo | 273/183 |
| 3,268,228 | 8/1966 | Novack | 273/183 |
| 3,555,563 | 1/1971 | Grossman | 351/46 |
| 3,670,193 | 6/1972 | Thorington | 313/108 R |
| 4,229,082 | 10/1980 | Carreau et al. | 351/45 |
| 4,991,849 | 2/1991 | Fabanich | 351/45 |
| 5,177,510 | 1/1993 | Peters et al. | 351/45 |
| 5,305,027 | 4/1994 | Patterson | 351/44 |

FOREIGN PATENT DOCUMENTS

| | | | |
|---|---|---|---|
| 447650 | 3/1968 | Switzerland | 351/46 |
| 206311 | 11/1923 | United Kingdom . | |
| 208028 | 12/1923 | United Kingdom . | |
| 403067 | 5/1933 | United Kingdom | 351/45 |
| 529106 | 11/1940 | United Kingdom | 351/46 |

OTHER PUBLICATIONS

Golf magazine, "The bottom Line On Head Movement" Sep. 1992, pp. 84–85, anonymous.
Berman, S. M. "Energy Efficiency Consequences of Scotopic Sensitivity", Lawrence Berkeley Laboratory, Lighting Systems Research Group, Berkeley, California 94720, May 13, 1991.
Karpen, Daniel, P. E., "Full Spectrum Polarized Light Tackles Computer Screen Glare", AIPE Facilities magazine, Mar./Apr., 1991, pp. 35–38.
McLean, Jim, "Widen the Gap", Golf, Dec. 1992, pp. 49–53.

Primary Examiner—Ricky D. Shafer
Attorney, Agent, or Firm—Alfred M. Walker

[57] ABSTRACT

A golf sighting spectacle device is provided to be worn by a golfer to aid in sighting the golf ball during a swing. The sighting device is a spectacle consisting of lenses having neutral density filters transmitting 1.5 percent of the visible light and being opaque in the ultraviolet. The sighting device, for the right handed golfer, has a ⅛ inch diameter aperture in the left eyepiece located to the left and below the optical center of the eyepiece. In the version for the left handed golfer, the aperture is in the mirror image of the lens, being to the right and below the optical center instead of being to the left and below the optical center of the eyepiece.

15 Claims, 4 Drawing Sheets

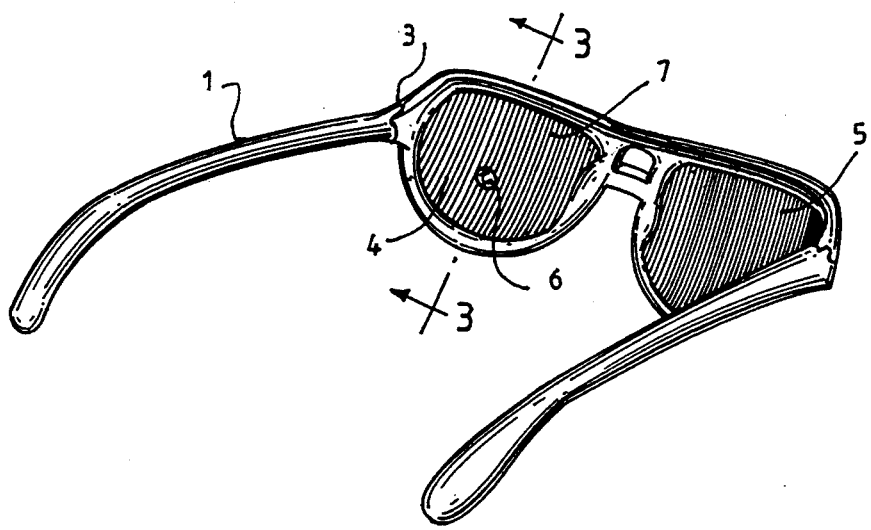
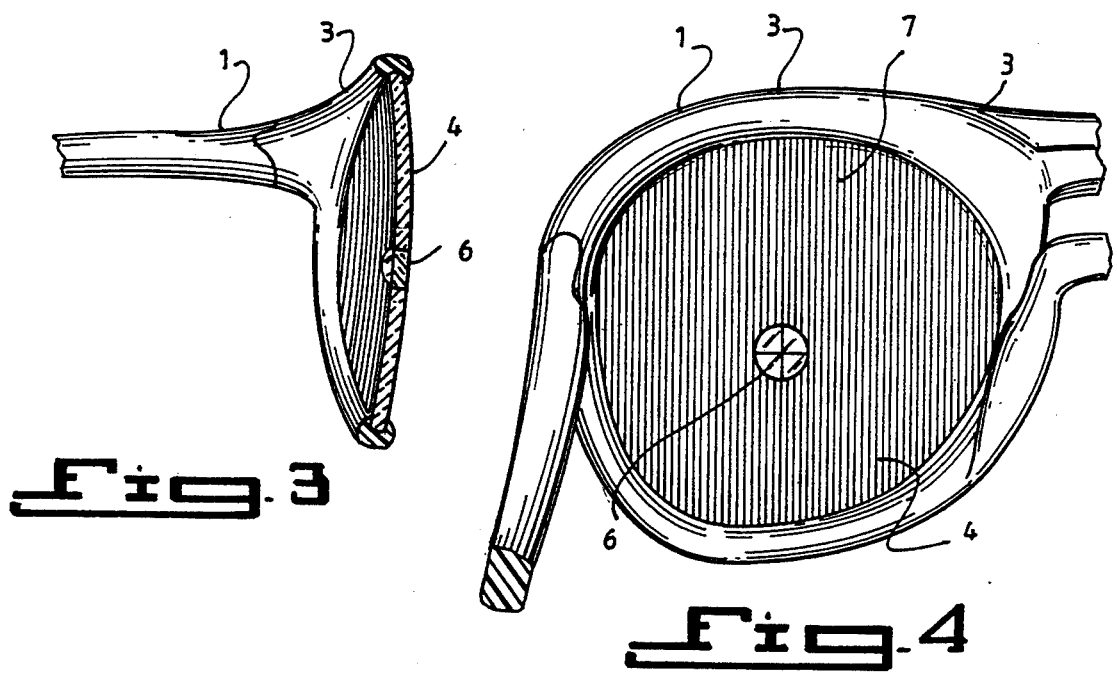

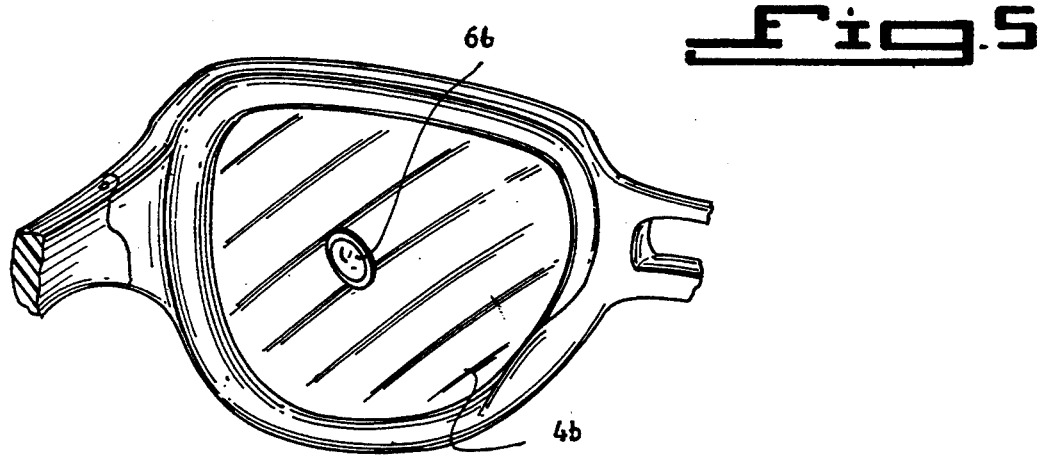
Fig. 5
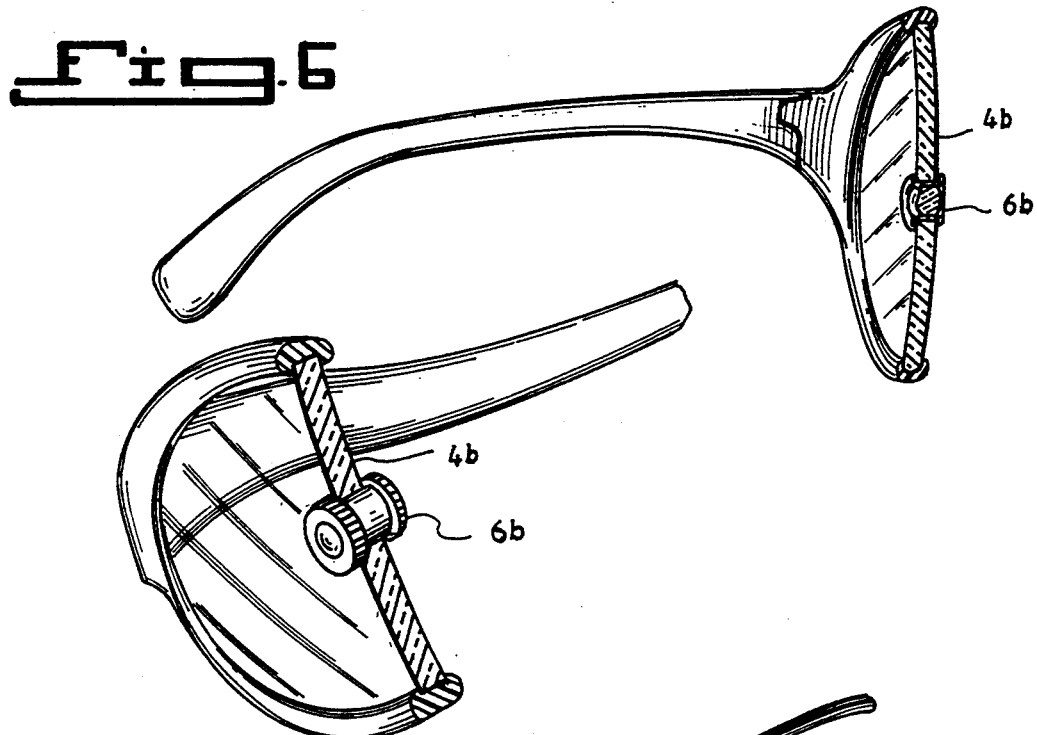
Fig. 6
Fig. 7
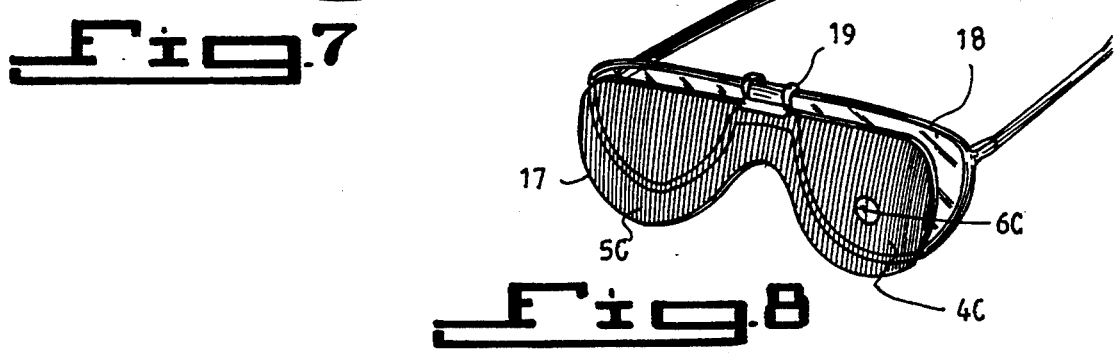
Fig. 8

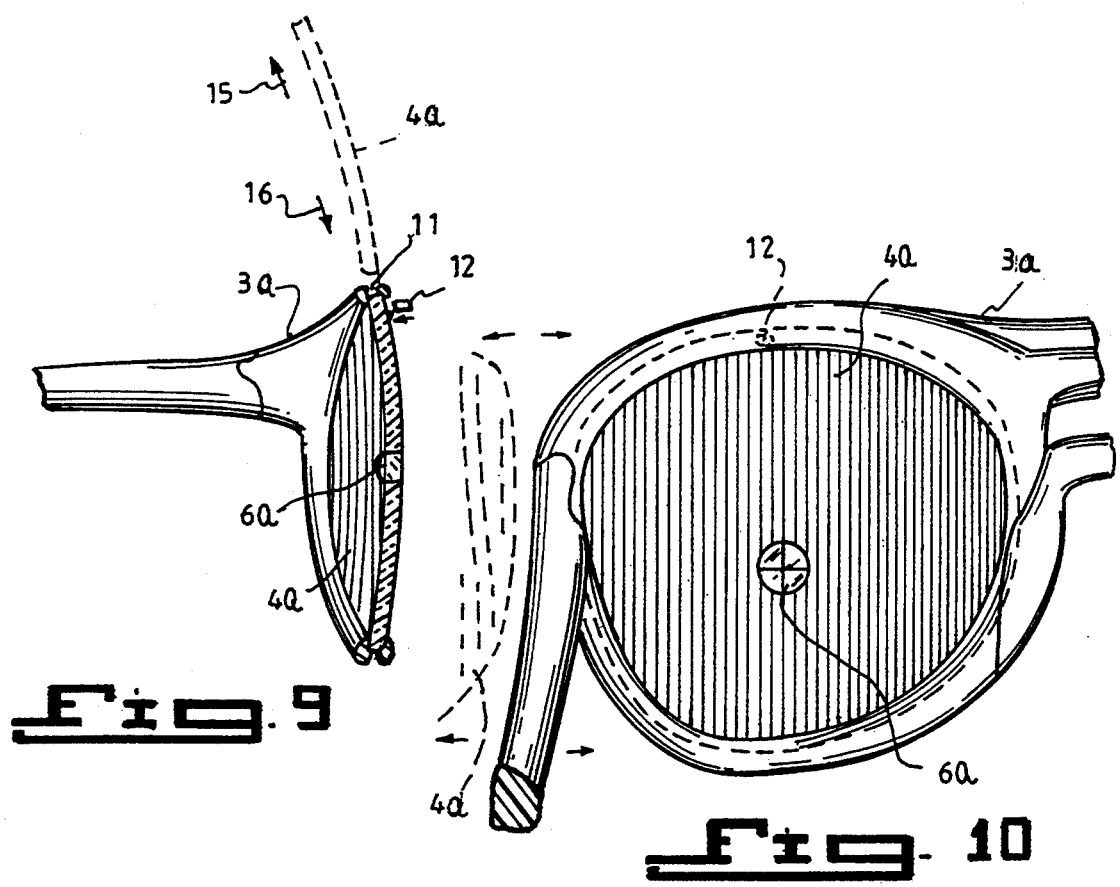

GOLF STABILIZER FOR LESS DOMINANT EYE

This application is a continuation of application Ser. No. 07/988,100, filed Dec. 9, 1992, now abandoned.

FIELD OF THE INVENTION

This invention relates to a set of optical sighting eye glasses to be worn by a golfer to aid in keeping the less dominant eye focused, even while the head and neck are moving.

BACKGROUND OF THE INVENTION

Before describing the device or the present art, some background on the sport of golfing is necessary. Much attention has been paid in the game of golf in the development of a proper swing. To hit a ball squarely without an inward "hook" or an outward "slice" it is necessary for the golfer to hold his head substantially motionless and to fix his eyes upon the ball, during the backswing, the swing, and part of the follow through. What happens is that many golfers, including professionals, fail to exercise proper head control during the various phases of the swing, permitting their head to move out of sync with the swing and their eyes to wander.

In addition, the back swing should be controlled to prevent an excessive back swing which would pull the eyes off the ball. Also, during the swing, the body should pivot with the spinal column as an axis.

As noted in the September 1992 issue of GOLF Magazine, page 84, pertaining to head movement during a golf swing, the golfer's head may move, but the left eye should be focused upon the ball. Therefore, moving one's head, contrary to popular belief, is desirable, as long as the less dominant eye stays focusing on the golf ball, as the head and neck move.

Moreover, according to Jim McLean, in "Widen the Gap" in GOLF Magazine, December 1992, pages 49–53, it is also important to maximize the movement of the shoulders during a golf swing. By doing so, the more the shoulders move, the more the head moves and the greater the tendency is to loose visual contact with the golf ball.

The most important point to be emphasized in the above discussion is the necessity to fix the eyes upon the ball.

Various types of devices have been patented in the prior art to aid a golfer in focusing his eyes on the ball during a swing. As the game of golf is an old one, the development of sighting aids is an old art.

Any early optical device used two sighting holes in a pair of eye glass lenses (see Ramsay, "Optical Device For Use in Playing the Game of Golf or Like Ball Games". U.S. Pat. No. 1,133,921. This instrument which is in the form of a pair of pince-nez or spectacles, has a species of opaque "blinkers" with a relatively small apertures in them, through which the wearer can see. The small apertures severely limit the golfer's field of view and thus limits the view of the distance in front and behind a ball needed to strike the ball. This area is so small that the golfer must see it definitely, and this compels "keeping the eye on the ball". The device has two holes in the opaque lenses, one in each eyepiece, both of which are located along the center meridian. In the left eyepiece, the hole is to the left of center, and the hole in the right eyepiece is to the right of center.

An optical sighting device using a large hole in the left eyepiece (See McMurdo "Glasses" U.S. Pat. No. 2,045,399), had as one configuration, a large vertical rectangular hole in the left spectacle lens. The remainder of the left lens, along with the entire right lens, was entirely opaque.

A later version of the Ramsay patent had two narrow vertical slots in each lens (see Douglass, "Optical Device For Golf Instruction" U.S. Pat. No. 2,663,021. The eye glass lenses were opaque, and in one configuration, the narrow rectangular slots were centered in each lens. A second configuration described in the patent had the narrow slits inward of the center of the two lenses.

Another sighting aide used circular rings painted on the eye glass lenses (see Hull, "Golfing Aide", U.S. Pat. No. 3,228,696. Two distinct configurations were given in the patent of Hull. One configuration had the circular rings painted on clear lenses. The other configuration, which was for when sunglasses were used as a means of supporting the sights and positioning them before the eyes of a golfer, disclosed tinted sun glasses in which the tint is graded from top to bottom, becoming lighter at the bottom edge of the lens. In the device of Hull, the sighting rings are located near to the bottom center close to the frame.

A variation of the McMurdo sighting glasses used two rectangular holes in the upper portion of the two opaque lenses (see Novack, "Head Movement Control Device for Golfers" U.S. Pat. No. 3,268,228). In one variation of the art, the right eyepiece has a rectangular hole in the upper portion, being longer vertically than horizontally, and a larger square hole for the left eye piece. In the second type of sighting device, Novack teaches a "T" shaped hole in the upper portion of the eye piece, with a vertical for the left eye, and the stem of the "T" square shaped for the right eye piece.

Still another variation of the art used a horizontal line across the eyepiece in both eyes as a sighting aid (see Palumbo, "Golf Putt Aligning Device" U.S. Pat. No. 3,264,002, (1966). Palumbo teaches a dark horizontal line across the upper portion of the sighting device. In a second version, Palumbo teaches spectacles that have a solid wire type sighting located across the front of the sighting glasses, but on extenders from the temples, several inches in front of the frame. The linear sighting element is movable so the distance from the front of the lenses can be set by the user. In the Palumbo device, the eyepiece is transparent.

Eighty percent of right handed golfers are right eyed dominant. A right handed golfer must look at the ball with his left eye. A simple test can be performed to find out which eye is dominant. One takes an $8\frac{1}{2} \times 11$ inch piece of paper and put a hole $\frac{1}{4}$ inch diameter in the center. One gets a golf ball and puts it on the floor as if one is going to tee off. While holding the paper with one's arms extended over the ball with both eyes open, one simply closes one's right eye. If the ball disappears, one is right eye dominant. The present invention helps train one's left eye to stay focused on the ball. Moreover, it is disadvantageous to keep one's head truly still during the swing. Some head movement is necessary and, in fact, helpful. Freezing the head results in leaving one's weight on the left side and awkward reverse pivoting. The device of the present invention, the light tinted area the helps one perceive and pick the ball up visually and focus on it until viewing it becomes automatic.

Most important, it is not both eyes that pick and focus on the ball, but rather one's left eye for a right handed player.

OBJECTS OF THE INVENTION

The object of this invention is to stabilize and train the less dominant eye, and one eye only, to focus and visually perceive and pick the ball up with no stress and strain on the head and shoulders for a free mobile swing. In contrast, concentrating on keeping one's head still and both eyes on the ball while one addresses the ball can be especially awkward. Contrary to old beliefs, because it can relieve tension throughout one's neck and upper body, allowing one's head to swivel to the right as one starts the back swing, helps one get loose and get one's chin out of the way. Swiveling one's head and getting one's chin out of the way will free one's shoulders to make the swing turn. Once one visually picks up the area containing the ball with the less dominant eye, the present invention will help one's vision to stay on the ball so one can trigger the swing.

SUMMARY OF THE INVENTION

In keeping with the foregoing objects and others which will become apparent, the present invention includes a shaded pair of spectacles designed to aid the non-dominant eye of a golfer, wherein for a right handed person, for example, the left lens portion includes a circular sighting aperture to enable the person to focus visually on the golf ball with the less dominant eye, namely the left eye in the case of most right-handed persons, within a visually appreciable but substantially narrow, restricted and defined area surrounding the golf ball on the ground.

This focusing of the left eye, per the foregoing example, while allowing head movement, is a critical advantage of the present invention. Most of the prior art patent references indicate, incorrectly, that the entire head should stay still. Therefore, these older prior art patents disclose processes or devices which enable a golfer to look at a golf ball through apertures or sights on both lenses, thereby cramping the neck and restricting head movement and also promoting the golfer to visually attend to the dominant eye, which counteracts and cancels any golf skill benefit the player may otherwise have derived from using the left, less dominant eye to focus on the ball in preparing and executing the swing motion of the golf club. In short, using two eyes, even through two focused apertures as provided in the prior art, is undesirable.

The McMurdo patent, U.S. Pat. No. 2,045,399, is the only patent known by the inventor to provide a sighting aperture through one eye, namely the desirable non-dominant left eye in the case of a right handed golfer. However, what is disclosed in McMurdo is a rectangular aperture covering approximately 15% of the left lens surface area to give the golfer a "viewing window." In contrast, the crux of the present invention is that the McMurdo "window" when viewing a golf ball from a normal golfer's viewing height of approximately 5 feet above the ground, produces an inordinately large 40-50 inch diameter view field on the ground surrounding the golf ball. This is undesirable, since such a large diameter viewing area detracts from the golfer's ability to visually focus by presenting too great a viewing field.

The present invention provides a circular on-the-ground viewing field of approximately 8-10 inches in diameter. The present invention accomplishes this by using a spectacle within which there is a semi-opaque translucent lens which produces the 8-10 inch diameter circular viewing field on the ground where the golf ball is to be viewed. This circular viewing field is not much larger than the circumference of the golf ball. The small diameter viewing field provides a sufficiently wide viewing angle so as to enable the golfer to visually focus on the ball and yet rotate the head sufficiently to allow a desirable amount of head-turning motion during the golf swing, while also allowing total visual focus upon the ball during the simultaneous head-turning and club-swinging.

Therefore, the novelty of the present invention lies in minimizing the viewable area around the ball while continuing to provide a viewing angle which is precise and yet sufficient to permit an efficient amount of head-turning during the golf swing, thus resulting in an accurate and desirable golf swing. The small circular spectacle aperture of the present invention enables the head to rotate by minimizing the possibility of deviation from the fixed point of rotation, namely, at the left eye. However, if a larger rectangular area were provided such as in McMurdo, instead of the smaller, precise aperture of the present invention, the rotation of the head tends to have an erratic path, thereby increasing the likelihood of deviating from the desired movement of the head, the arms, the legs and the torso the of the golfer, and thus potentially ruining the golf swing.

Furthermore, as noted above, according to Jim McLean, in "Widen the Gap" in GOLF Magazine, December 1992, pages 49-53, it is also important to maximize the movement of the shoulders during a golf swing. By doing so, the more the shoulders move, the more the head moves and the greater the tendency is to loose visual contact with the golf ball.

Therefore, the wide visual field of McMurdo does not assist the golfer in focusing on the golf ball, because with a large visual field as in McMurdo, the viewing eye has too large of an area in which to view and focus on the ball.

Moreover, the present invention provides a translucent lens, which is not entirely opaque, to enable the user to also partially view the ground area outside of the 8-10 inch circular visual field surrounding the ball.

The right eye is dominant in 80% of the population. To properly train the left eye to focus on the ball, one needs two types of sighting devices, one type for golfers who are right handed, and one type for golfers who are left handed. In the right handed embodiment, the sighting device has a hole ⅛ of an inch in diameter located 5/16 inch to the left of center and 3/16 inch below the center in a diagonal from the optical center of the left eyepiece. In the embodiment for the left handed golfer, the hole is in the right eyepiece, and is located to the right of center below the center line of the eyepiece 3/16 inch below the center line and 5/16 inch to the right of the center. Thus, the position of the hole for the left handed golfer is reversed from the version for the right handed golfer.

DESCRIPTION OF THE DRAWINGS

FIG. 2 shows the spectacles with the hole in the left eyepiece for right hand golfer.

FIG. 3 shows a side view through the eyepiece of the ⅛ inch diameter hole.

FIG. 4 shows a close-up of the lens in FIG. 2.

FIGS. 5-7 show an alternate embodiment of the device with a built-in sighting scope.

FIG. 8 shows a perspective view of an alternate embodiment with a clip-on pair of sunglasses for prescription spectacles.

FIGS. 9 and 10 show an alternate embodiment with a movable lens.

DETAILED DESCRIPTION OF THE PREFERRED EMBODIMENT

Figure 1:
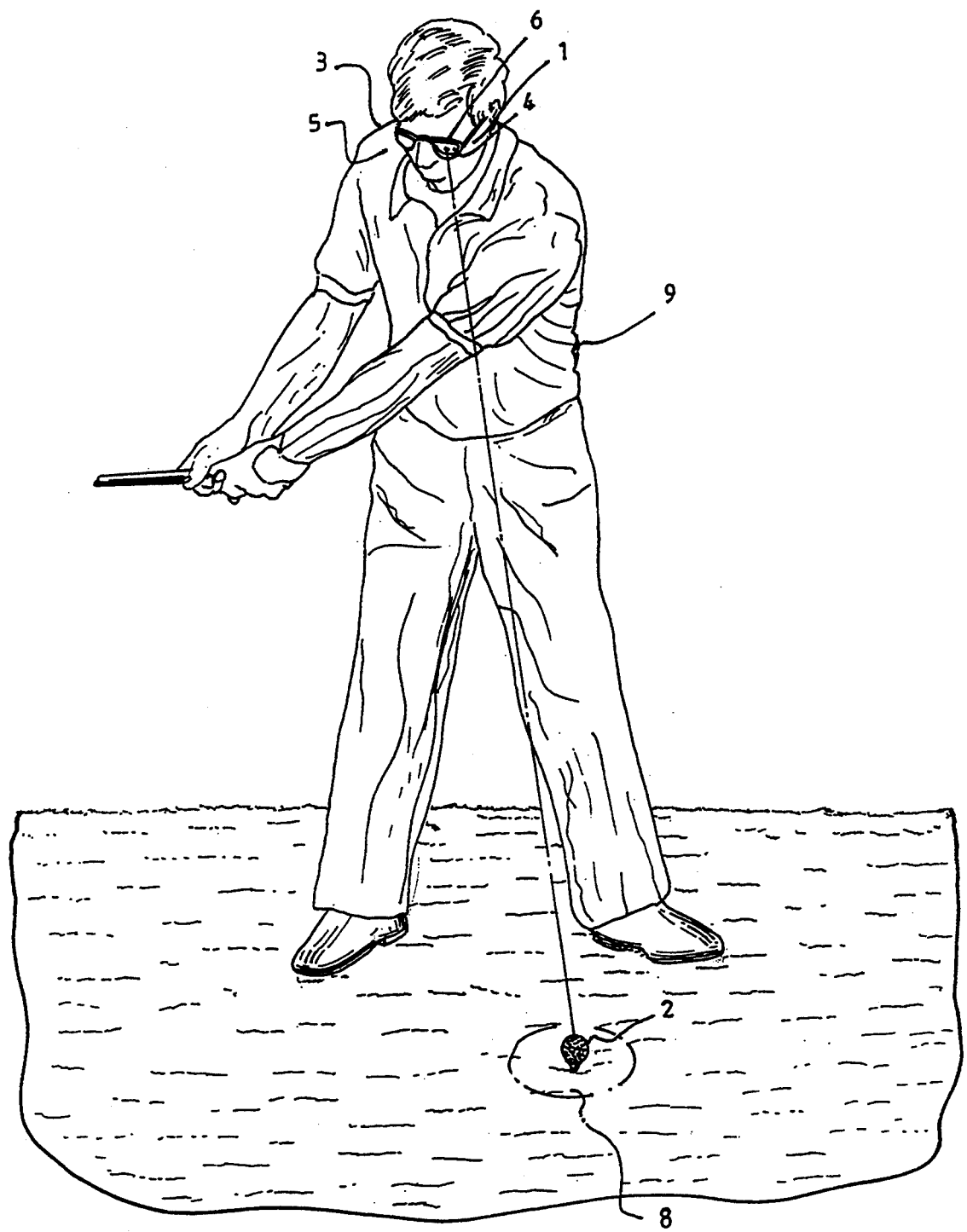
FIG. 1 shows the proper stance for a golf swing, with the eye focused on the golf ball.

As shown in FIGS. 1-4, a golf sighting device 1 is provided to be worn by a golfer 9 to aid in sighting the golf ball 2 during a swing. The sighting device is a spectacle 3 including lenses 4 and 5 having neutral density filters transmitting 1.5% of the visible light and being opaque in the ultraviolet. The sighting device 1, for the right handed golfer, preferably has an approximately ⅛ inch diameter aperture 6 in the left eyepiece lens 4, such that aperture 6 is located to the left and below the optical center 7 of the eyepiece lens 4. In the version for the left handed golfer, the aperture is in the mirror image position as compared to the right-handed version, being to the right and below the optical center instead of being to the left and below the optical center of the eyepiece.

Experience has shown that an aperture 6 of approximately ⅛ inch in diameter provides a visual field of view 8 around the golf ball 2 of between 8 and 10 inches depending on the height of the individual golfer 9 and the type of golf club 10 used for the shot. Obviously, the use of a wood for distance driving would provide a larger field of view 8 than use of a sand wedge iron on the green for a close-in shot.

The present invention is different from the previous golf sighting devices not only in the size and location of the sighting aperture 6, but also for the use of a different sighting device for the left handed and right handed golfers, in that the right eyepiece is a mirror image of the left eyepiece.

The golf sighting device 1 to be worn by a right handed golfer 9 to aide in sighting the golf ball 2 during a swing, includes spectacle 3, including the plurality of lenses 4 and 5. The sighting device 3 has the round aperture 6 in the left eyepiece lens 4 located to the left and below the optical center 7 of said left eyepiece lens 4.

A golf sighting device may also be provided to be worn by a left handed golfer to aide in sighting the golf ball during a swing, including a spectacle (not shown) including a plurality of lenses, with the corresponding right lens having a round aperture in the right eyepiece lens located to the right and below the optical center of said right eyepiece lens.

The pair of pince-nez or spectacles 3 for the right landed golfer 9, may have alternatively a substantially opaque lens with a relatively small aperture in one of said lenses, through which, and through which alone, the golfer 9 can see a golf ball.

In the preferred embodiment aperture 6 is located approximately 5/16 inch to the left of center and 3/16 inch below the center in a diagonal from the optical center 7 of the left eyepiece lens 4. In the version for the left handed golfer, the aperture is in the right eyepiece lens, and is located to the right of center below the center line of the eyepiece approximately 3/16 inch below the center line and 5/16 inch to the right of the center, such that the position of the aperture 6 for the left handed golfer is reversed from the version for the right handed golfer 9.

For light transmittance, preferably the lenses 4 and 5 have neutral density filters transmitting 1.5 percent of the visible light and are opaque to ultraviolet light, to maximize visual acuity through the shaded remainder of the lens 4 outside of transparent aperture 6. As such, even though the vision through the remainder of lens 4 is diminished, the reduction of the ultraviolet enables the golfer 9 to still see the area not viewed through aperture 6, so that the golfer 9 can see the stroke of the golf club approaching the circular field of view 8 through the aperture 6 surrounding the ball 2.

Therefore, sighting device 3 includes lens 4 that is not totally opaque, by using a material that is not opaque, but transmits 1.5 percent of the visible light using a neutral density filter transmitting the same proportion of light across the entire visible spectrum so as to make sure the eye receives so called "full-spectrum" light consisting of all the colors in the same proportion as natural daylight, such that if there were to be a reduction in the amount of blue light coming through the lens without a corresponding reduction in the amount of yellow light, there would be a significant reduction in the amount of visual acuity beyond that experienced by a straightforward reduction in light intensity of 98.5 percent.

The device 1 enables the golfer 9 to move his or her head in an efficient and correct position through-out the golf stroke, thereby producing a stroke which is both regular and reproducible. The aperture 6 provides a space through which a golfer may view a golf ball when his head is in proper position. The frame 3 supports the lenses 4 and 5 in this operative position before the eyes of golfer 9.

In another embodiment, the device 1 may include a pair of transparent celluloid lenses, both of said lenses being colored, a small clear portion near the outside edge of one of said lenses.

In general, the golfing aid spectacle 1 includes the frame 3, first and second opaque eyepieces lens 4 and 5 secured to the frame 3, with the first eyepiece lens 4 including the aperture 6, the aperture 6 being located in an inner quadrant of the respective eyepiece lens 4 near the center 7 of eyepiece 4. The aperture 6, being approximately ⅛ inch in diameter, is substantially smaller than eyepieces lens 4, and is surrounded on all sides by the semi-opaque material of the lens 4.

While lens 4 may be of any type of translucent, semi-opaque material, the preferred embodiment uses a material that is not opaque but transmits 1.5 percent of the visible light using a neutral density filter. A neutral density filter transmits the same proportion of light across the entire visible spectrum so as to make sure the eye receives so called full spectrum-light consisting of all the colors in the same proportion as natural daylight.

As with other embodiments of the present invention, if there were to be a reduction in the amount of blue light coming through the lens without a corresponding reduction in the amount of yellow light, there would be a significant reduction of visual acuity beyond that experienced by a straight forward reduction in light intensity of 98.5 percent.

The golfing spectacle 1 is worn by the golfer 9 in aligning a golf ball 2 with a target object. The aperture 6 enables golfer 9 to view the distance from the lens 4 to the golfer's eyes, such that golfer 9, when looking through aperture 6 of the lens 4 of golfing spectacle device 1, sees the golf ball 2 through the aperture 6 in the lens 4.

In a further embodiment shown in FIG. 5–7, a separate built-in sighting scope 6b is provided in lens 4b.

Alternatively, as shown in FIG. 8, the device includes a pair of clip-on sunglasses 17 having a pair of lenses 4c and 5c for use with prescription glasses 18 worn by a golfer, and an adjusting means 19 for adjusting the sunglasses 17 vertically when positioned on the eyeglass frame 18, and a target sight aperture 6c in one lens 4c of the sunglasses 17.

As shown in FIGS. 9 and 10, in one variation of the device, the lens is slidable within a groove within a dual sided frame. Therefore, if one wishes to move the position of the sighting aperture, the lens itself is moved left or right, or up or down, within the groove for repositioning. Tightening of the lens within the new position is accomplished with a conventional tightening means, such as a set screw.

EXAMPLE OF THE PRESENT INVENTION IN USE

In order to establish the field of view around a golf ball as seen through sighting glasses with a ⅛ inch aperture, a yard stick was laid on the floor with a golf ball next to it. A golf club was held, in this case a putting club, as a golfer would be using it. A user then sighted through the hold and determined the width of the sighted area by reading the inch measurements on the yardstick. The user is five feet nine inches tall, and the width of the field of view around the golf ball was between 8 and 10 inches.

The 8–10 inch field of view provides unexpected beneficial results in helping the golfer 9 focus on a spatially limited visual area surrounding golf ball 2.

In contrast, the aforementioned McMurdo device, which is believed to be the only device having a aperture in one single lens rather than in both lenses, provides too large a field of view around the ball, so that the golfer cannot adequately focus on the ball. The McMurdo patent provides no information on the exact dimensions of the sighting aperture; therefore, one cannot determine the precise size of the field of view. However, it was roughly estimated that the size of the opening in McMurdo is about 50 percent of the height of the eyepiece and 20 percent of the width. Therefore it was estimated that its field of view is between 20 and 30 inches wide and from 24 to 40 inches in the vertical direction. These measurements comparing the McMurdo device to the present invention were estimated by viewing at a standard sized square tile floor and counting the tiles assuming an outline of the opening on the eyepiece.

The estimate of the percent transmission of the semi-opaque material was made by measuring the amount of light being transmitted in the photopic range (day vision) by using a Minolta T-1 Illuminance Meter. Measurements were made in direct sun by placing the semi-opaque material on the light detector of the light meter and noting the amount of light being transmitted through the material.

It is well known in the lighting literature that yellow light is deteriorative to visual acuity and blue light is not deteriorative to visual acuity. See, for example, Berman, Sam, "Energy Efficiency Consequences of Scotopic Sensitivity" Lawrence Berkeley Laboratory, Lighting Systems Research Group, Berkeley, Calif. (May 13, 1991), to be published.

As discussed above, it has been found that a smaller aperture would lead to a reduction in the amount of light in the field of view necessary to properly see the golf ball. An experiment was done using a smaller aperture which was 3/32nds inches in diameter on Oct. 29, 1992, and it was found not to work.

Other experiments were made using an eyepiece with a four percent transmittance, and it was found that there was insufficient visual contrast between the field of view and the surrounding area.

As mentioned above, if the spectacle lens material surrounding the aperture was completely opaque, one would have more difficulty setting up one's swing.

In summary, a golf sighting device is provided to be worn by a golfer to aide in sighting the golf ball during a swing. The sighting device is a spectacle including a pair of lenses having neutral density filters transmitting 1.5 percent of the visible light and being opaque in the ultraviolet. The sighting device, for the right handed golfer, has a ⅛ inch diameter aperture in the left eyepiece located to the left and below the optical center of the eyepiece. In the version for the left handed golfer, the aperture is in the mirror image of the lens, being to the right and below the optical center instead of being to the left and below the optical center of the eyepiece.

It is noted that various modifications may be made to the present invention without departing from the spirit and scope of the appended claims.

We claim:

1. A golf sighting device to be worn by a golfer to aid in sighting a golf ball during a swing, comprising:
   a spectacle including a pair of tinted lenses, wherein said pair of tinted lenses includes a right lens and a left lens, said sighting device consisting of only one circular aperture located in one of said lenses, positioned to the side and below the optical center of one of said pair of lenses, and the other of said pair of lenses being substantially tinted to substantially obscure the vision of the golfer's dominant eye.

2. The device as in claim 1 wherein the device is worn by a right-handed golfer and said aperture is positioned only in said left lens, the aperture being located to the left side of the center of said left lens.

3. The sighting device as in claim 2, wherein said aperture of said left lens of said sighting device is approximately ⅛ of an inch in diameter, said aperture being located approximately 5/16 inch to the left of center and approximately 3/16 inch below the center in a diagonal from the optical center of said left lens.

4. The device as in claim 1 wherein the device is worn by a left-handed golfer and said aperture is positioned only in said right lens, said aperture being located to the right side of the center of said right lens.

5. The sighting device as in claim 4, wherein said aperture of said right lens of said sighting device is approximately ⅛ of an inch in diameter, said aperture being located approximately 5/16 inch to the right of center and approximately 3/16 inch below the center in a diagonal from the optical center of said right lens.

6. The device as in claim 1 wherein said lenses have neutral density filters transmitting 1.5 percent of the visible light and said lenses being opaque to ultraviolet light.

7. The sighting device as in claim 1, wherein said pair of lenses are translucent, said pair of lenses being not totally opaque, each of said pair of lenses comprises a neutral density filter transmitting 1.5 percent of the visible incident light, each of said pair of lenses further transmitting the same proportion of light across all light wavelengths of the visible spectrum of light so as to ensure that the user receives a full natural spectrum of light comprised of all the natural light wavelengths in substantially the same proportion as natural daylight.

8. The device of claim 7, further where reduction of intensity of incident light transmitted by said neutral density filter occurs equally for all incident light wavelengths and wherein further, each of said pair of lenses avoids selective reduction of some wavelengths of the visible spectrum of light while permitting selective transmission of other wavelengths of the visible spectrum of light, thus ensuring the user maximum visual acuity.

9. The device of claim 1, further comprising:
   a frame, said pair of tinted lenses being substantially opaque and secured to said frame and said device further includes means for holding said frame in a fixed position with respect to said golfer.

10. A golfing spectacle as in claim 1, to be worn by a golfer in aligning a golf ball with a target, said device further comprising:
   a frame member, said pair of tinted lenses being substantially of a translucent material and affixed to said frame member.

11. A device for enabling a golfer to move one's head in a correct position through-out a golf stroke, thereby producing a precise, regular, reproducible stroke with regularity, said device comprising a pair of colored opaque lenses wherein said pair of colored opaque lenses includes a right lens and a left lens, said device consisting of only one circular cut-out transparent portion, located in one of said pair of colored opaque lenses, said circular cut-out transparent portion being positioned to the side and below the optical center of said left lens for use by right-handed golfers or positioned to the side and below the optical center of said right lens for left-handed golfers and the other of said pair of colored opaque lenses being substantially opaque to obscure the vision of the golfer's dominant eye, said circular cut out transparent portion providing a space through which a golfer may view a golf ball when the golfer's head is in proper position, said device further having means to support said pair of colored opaque lenses in operative position before the eyes of a user.

12. The device of claim 11, wherein said pair of colored opaque lenses are colored celluloid lenses.

13. A golfing sighting device to be worn by a golfer to aid in sighting a golf ball during a swing, comprising:
   a pair of clip-on opaque lenses, including a first opaque lens and a second opaque lens for use with prescription spectacles worn by a golfer, an adjusting means for adjusting said pair of clip-on opaque lenses vertically when said pair of clip-on opaque lenses are positioned on said spectacles, and said sighting device consisting of only one small, circular viewing aperture located to the side and below the optical center of said first lens, said second lens of said pair of lenses being substantially tinted to substantially obscure the vision of the golfer's dominant eye while the golfer is viewing the golf ball.

14. The device as in claim 13 wherein said viewing aperture is in said left opaque lens.

15. The device as in claim 13 wherein said viewing aperture is in said right opaque lens.

* * * * *